United States Patent
Ranzini (10) Patent No.: US 7,983,967 B2
(45) Date of Patent: Jul. 19, 2011

(54) METHOD FOR STOCK EXCHANGE FOR HANDLING A CURRENCY EXCHANGE

(75) Inventor: Stephen Lange Ranzini, Ann Arbor, MI (US)

(73) Assignee: University Bank, Ann Arbor, MI (US)

( * ) Notice: Subject to any disclaimer, the term of this patent is extended or adjusted under 35 U.S.C. 154(b) by 1812 days.

(21) Appl. No.: 09/924,005

(22) Filed: Aug. 7, 2001

(65) Prior Publication Data
US 2003/0040994 A1    Feb. 27, 2003

(51) Int. Cl.
*G06Q 40/00* (2006.01)
(52) U.S. Cl. ............... 705/35; 705/36 R; 705/37
(58) Field of Classification Search ........... 705/35, 705/37, 1, 41, 1.1, 39; 235/379, 380
See application file for complete search history.

(56) References Cited

U.S. PATENT DOCUMENTS

| | | | |
|---|---|---|---|
| 5,963,923 A * | 10/1999 | Garber | 705/37 |
| 6,278,982 B1 | 8/2001 | Korhammer | |
| 6,772,146 B2 * | 8/2004 | Khemlani et al. | 705/36 R |
| 6,952,683 B1 * | 10/2005 | Gerhard | 705/37 |
| 7,330,834 B1 * | 2/2008 | LaPierre | 705/37 |
| 2001/0025265 A1 * | 9/2001 | Takayasu | 705/36 |
| 2001/0049651 A1 * | 12/2001 | Selleck | 705/37 |
| 2002/0010673 A1 | 1/2002 | Muller | |
| 2002/0087454 A1 * | 7/2002 | Calo et al. | 705/37 |
| 2002/0087455 A1 * | 7/2002 | Tsagarakis et al. | 705/37 |
| 2002/0156718 A1 * | 10/2002 | Olsen et al. | 705/37 |
| 2002/0161692 A1 * | 10/2002 | Loh et al. | 705/37 |

FOREIGN PATENT DOCUMENTS
KR    2001008285 A    2/2001

OTHER PUBLICATIONS

Pasmantier, Anita B.; "Currency Options: From Inception to Present"; Review of Business; v13, n4; Spring 1992; pp. 1 and 2.*
Gerden, Paula; "Foreign exchange markets: new instruments in foreign exchange"; World of Banking, v2, n6; Nov. 1983; p. 1.*
Pasmantier, Anita B.; Review of Business, v13, n4; "Currency Options From Inception to Present"; Spring 1992; pp. 1-5.*
Richardson, Portia; Futures (Cedar Falls, Iowa), v23, n12; "OTC exchange. (two stock exchanges introduce new over-the-counter currency options)"; Nov. 1994; pp. 1 and 2.*
Richard Dusansky, David Franck, and Nadeem Naqvi; "The True Shadow Price of Foreign Exchange"; Journal of Economics and Finance; vol. 24, No. 2; Summer 2000; pp. 206-214.*
Cross, S.Y., The Foreign Exchange Market in the United States [online] Federal Reserve Bank of New York 1998 [retrieved on Apr. 4, 2002] Retrieved from the Internet: www.nyfrb.org/pihome/addpub/usfxm/ Chapter 3, pp. 15-22.
TMX Montreal Exchange Reference Manual, Currency Options, Apr. 2009, 12 pages, http://www.m-x.ca/f_publications_en/currency_options.pdf.
NASDAQ OMX PHLX World Currency Options FAQS, 3 pages, http://www.nasdaqtrader.com/Micro.aspx?id=phlxwcofaqs.

* cited by examiner

*Primary Examiner* — Ella Colbert
(74) *Attorney, Agent, or Firm* — Finnegan, Henderson, Farabow, Garrett & Dunner LLP (57) ABSTRACT

Systems and methods related to performing a currency exchange are presented. Through the establishment of "exchange shares," embodiments allow for the execution of a currency exchange using existing stock markets.

18 Claims, 4 Drawing Sheets

```
┌─────────────────────────────────┐
│ Establish Exchange Shares       │
│                                 │
│                          101    │
└─────────────────────────────────┘
              │
              ▼
┌─────────────────────────────────┐
│  Establish Exchange Share       │
│       Market Makers             │
│                                 │
│                          103    │
└─────────────────────────────────┘
```

METHOD FOR STOCK EXCHANGE FOR HANDLING A CURRENCY EXCHANGE

FIELD OF INVENTION

This invention relates to systems and methods for exchanging currency.

BACKGROUND INFORMATION

Currency exchange is one of the largest financial services markets with transactions averaging $1.5 trillion per day. Currency exchange may be performed for a variety of reasons.

For example, an American retailer may need to purchase cameras from a Japanese company. Depending on the details of the agreement, the retailer might pay the Japanese company with either Yen or U.S. Dollars. If the retailer is to pay in Yen, he will need to exchange an appropriate amount of U.S. Dollars for Yen. Even if the retailer pays in Dollars, currency exchange is likely as the Japanese company will likely wish to exchange at least some of the received U.S. Dollars for Japanese Yen. In a likewise manner, currency exchange is necessary when a company purchases supplies or components from a foreign entity. Because of the increasing ubiquity of transactions among business entities located at various points all over the world, it is fair to state that currency exchange plays a vital role in the execution of modern business.

As another example, an American investor might guess that, due to certain geopolitical conditions, the value of the Euro will rise with respect to the U.S. Dollar. Such an investor might choose to exchange a certain number of U.S. dollars for Euros, with the hope of exchanging those Euros for dollars at a later date for a profit. Thus currency exchange also provides an investment opportunity.

Foreign exchange is also necessary for the purchase of foreign bonds and securities. For example, an American wishing to purchase Canon stock on the Nikkei exchange would first need to exchange U.S. dollars for Yen. Similarly, an American wishing to purchase German government bonds would first need to exchange U.S. Dollars for Euros. It is estimated that as much as 90% of currency exchange is related to security and bond transactions.

Despite the importance of currency exchange, the mechanisms currently in place for performing such exchange are flawed. For example rather than being able to perform currency exchange themselves using a broker, individuals and entities typically rely upon banks to perform the exchange on their behalves.

Furthermore, individuals and entities performing currency exchange are often unable to adequately control the rate at which an exchange will occur. Reasons for this include the relatively large amount of time that often occurs between request for a trade and its execution. Because of the large quantities of currency which are often exchanged, even small changes in exchange rate can have major effects. For example, suppose an American computer manufacture agreed to purchase ten thousand microprocessors at a cost of 4,000 yen each. If, at the time the deal were made, the exchange rate was 81 Yen per U.S. Dollar, the American company would expect to pay a total of $493,827.16. If at the point the currency exchange actually occurred the rate was 79 Yen per Dollar (a change of only 2.45%), the American company would end up paying a total of $506,329.11, $12,501.95 more then expected.

Additionally, factors such as the lack of open, centralized markets results in direct exchanges between certain currencies not being possible. For example, it might not be possible to directly exchange currency A for currency B. Thus it would become necessary to exchange currency A for currency Q, and then to exchange currency Q for currency B. The necessity of such additional steps not only increases the time required to perform a trade, but may also lead to additional costs. For example the labor required to perform the additional steps can lead to higher fees from the banks performing the exchanges. Perhaps more importantly, the increased time for the completion of an exchange increases the likelihood that the rates will stray from what they were when the exchange was decided upon. This might lead to an unexpected loss of capital.

For at least these reasons, there is a need for an improved currency exchange method.

SUMMARY OF THE INVENTION

In one embodiment of the invention there is provided a method for empowering a stock exchange to handle currency exchange comprising establishing on a stock exchange a predetermined number of exchange shares, each exchange share representing a first currency valued in terms of a second currency and establishing a predetermined number of market makers, each market maker having responsibilities for at least one of the exchange shares.

In another embodiment of the invention there is provided a method for allowing individuals to exchange currency comprising listing on a stock exchange a predetermined number of exchange shares, each exchange share representing a first currency valued in terms of a second currency and hosting a predetermined number of market makers, each said market maker having responsibilities for at least one of said exchange shares.

In these embodiments, the responsibilities of the market makers include but are not limited to posting bids and offers for the exchange shares and offering to purchase or sell them for posted amounts.

Still another embodiment of the invention provides a method for performing currency exchange comprising placing a request with a broker, having the broker pass the request to a market maker, having the market maker execute the request.

A further embodiment of the invention provides a system and method for determining the amount of native currency that can be received in return for a specified number of shares of a first exchange share, determining the number of shares of a second exchange share that can be purchased for the determined amount of native currency, and simultaneously submitting a request to sell the specified number of shares of the first exchange share, and a request to purchase the determined number of shares of the second exchange share.

DETAILED DESCRIPTION OF THE INVENTION

According to embodiments of the present invention, stock exchanges may be empowered to handle currency exchange. The details of implementing the present invention will now be described in detail.

Establishment of Exchange Shares

A stock exchange of the sort currently in operation lists "quotes" for each of the plurality of securities (i.e., "stocks") that it handles. The "quote" for a particular security typically comprises one or more bid and offer prices for that security. These bid and offer prices tend to be expressed using the native currency of the exchange. For example in the NASDAQ exchange, where the native currency is the U.S. Dollar, the level 1 quote for Apple Computer might note that the best bid price is $19.62 and that the best offer price is $19.64. This quote would suggest that one wishing to sell shares of the stock using the exchange mechanism could expect to receive $19.62 per share, while one wishing to but shares of the stock using the exchange mechanism could expect to pay $19.64 per share.

Figure 1:
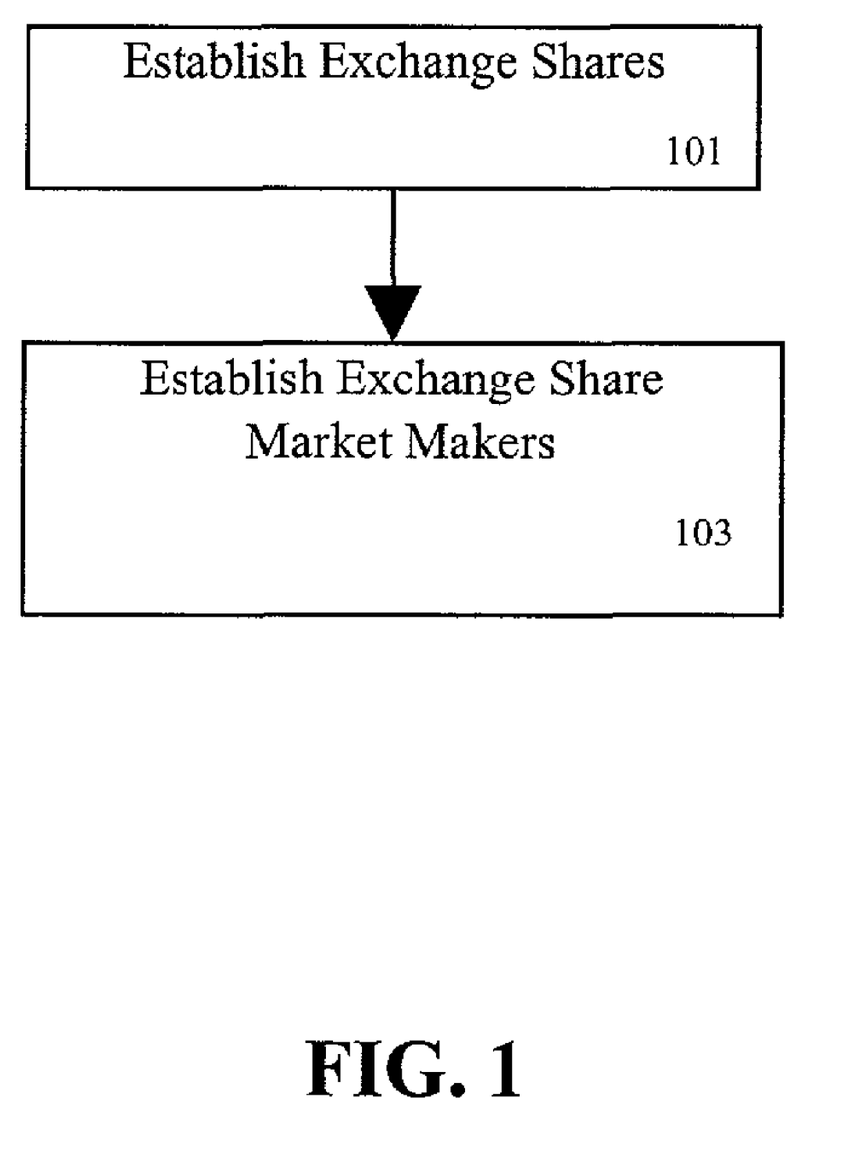
FIG. 1 is a flow chart outlining the overall procedure for empowering an existing stock market to foreign currency exchange by way of an embodiment the invention.

A first step in allowing an existing stock exchange to handle the exchange of one or more foreign currencies may be to present each of the currencies in a form compatible with this quotation mechanism. According to embodiments of the present invention, this may be achieved through the establishment of "exchange shares" (step 101). In certain embodiments of the invention, an exchange share represents a predetermined number of units of a foreign currency to be offered for trade in terms of the native currency of a stock exchange. In some cases, the name of the exchange share may incorporate the ISO 3166-1 two-letter country codes relating to the foreign and/or native currencies. Thus the name might be a four letter code, the first two letters being the ISO country code for the native currency and the last two letters being the ISO country code for the foreign currency.

For example, a particular exchange share may represent 1000 Yen to be listed on the NASDAQ exchange in terms of the native currency of the exchange, the U.S. Dollar. If ISO country codes were employed in nomenclature, this exchange share might be given the name "USJP," where "US" and "JP" are the ISO codes for the United States and Japan respectively.

In this way, an exchange share could be established for each foreign currency that was to be listed on a particular exchange. For example, if it were desired to list the currencies of Japan, Canada, and Europe (ISO codes "JP," "CA," and "EU" respectively) on an exchange whose native currency was the U.S. Dollar (ISO country code "US"), the following exchange shares might be established:

| USJP | USCA | USEU |
|------|------|------|

Once defined, exchange shares could be presented on current stock exchanges using their existing quotation mechanisms. The quote for a particular exchange share could comprise one or more bid and offer prices for that share. Referencing the above exemplary exchange share "USJP," the quote's best offer might indicate that an individual or entity could expect to pay $12.35 in order to acquire ¥1,000, while the quote's best bid might indicate that an individual or entity could expect to receive $12.32 in exchange for ¥1,000. Therefore, bid and offer prices for an exchange share might be thought of as imparting information somewhat akin to exchange rate information.

As alluded to above, existing stock exchanges tend to perform trades and list quotes only in terms of native currency. However, it is envisioned that certain stock exchanges might be willing to list and perform trades for exchange shares in terms of currencies other than native currency. Accordingly, in certain embodiments of the present invention an exchange share can represent a predetermined number of units of a foreign currency to be offered for trade in terms of a currency other than the native currency of the stock exchange upon which it is listed. In such an embodiment the name an exchange share may be a four letter code, the second two letters being the ISO code relating to the currency offered for trade and the first two letters being the ISO code relating to the currency in terms of which the trade will be performed.

Imagine an exchange, whose native currency was the U.S. Dollar, that was willing to list exchange shares in terms of a currency other than its native currency. If it were desired to list on this exchange the currencies of Japan, Canada, and Europe, the following exchange shares might be established:

| USJP | USCA | USEU |
|------|------|------|
| JPCA | JPEU | CAEU |

Where, for example, "USCA" represents Canadian Dollars to be traded in terms of U.S. Dollars, while "JPCA" represents Canadian Dollars to be traded in terms of Japanese Yen.

Although in the above examples only certain currencies are shown, it will be obvious to those of skill in the art that exchange shares may be created which involve currencies other than those which have been specifically illustrated. Thus, by the present invention an existing stock exchange may be equipped to offer as many of the world's currencies as is desired.

Establishment of Market Makers

When doing business with an existing stock exchange, one typically places a buy or sell request with a broker. The broker passes the request to individuals that are responsible for actually executing the request. Each such individual typically has responsibilities relating to one particular stock. The NASDAQ exchange calls them "market makers" and has approximately 11 per stock, while the NYSE calls them "specialists" and has one per stock.

Thus, existing stock exchanges expect there to be at least one such individual for each stock traded upon it. Accordingly, a second step in allowing an existing stock exchange to handle foreign currency exchange may be to establish at least one "exchange share market maker" for each exchange share to be offered (step 103). In certain embodiments, there may be 11 exchange share market makers per exchange share.

Each exchange share market maker plays a role in keeping the market liquid by ensuring that there is always a place where an individual or entity can buy or sell the exchange share for which that market maker is responsible. The market maker does this by maintaining a certain inventory of that exchange share and agreeing to buy and sell it at posted prices.

Accordingly, each market maker periodically announces the price he wishes to pay for a share of the exchange share for which he is responsible. This constitutes his bid price. Each market maker also periodically announces the price at which he wishes to sell a share of that exchange share. This price is known as his offer price. The highest bid price among bids announced by all of the market makers responsible for a particular exchange share constitutes the "best bid" for that exchange share. Similarly, the lowest announced offer price among the market makers responsible for a particular exchange share constitutes the "best offer" for that exchange share. In some embodiments, market makers would agree to execute received buy and sell requests and the best offer and best bid prices respectively.

With the role of exchange share market maker comes both risk and opportunity. There is risk because if there is a sell-off of a particular exchange share, the market makers responsible for that exchange share should collectively purchase all outstanding exchange shares being offered. Also risk because if there is a buying spree for an exchange share but not enough sellers, the market makers for that exchange share should sell from their own inventories.

Opportunity arises through a number of mechanisms by which money may be earned. For example, a market maker may keep "spread" money, the difference between what a market maker pays for an exchange share and what he sells it for. As one example of earning spread money, imagine an exchange share USEU representing 100 Euros priced in U.S. Dollars. Suppose the best bid price for USEU is $88.50, the best offer price is $88.55, and the market makers have agreed to buy at the best bid price. An individual or entity wishing to sell an USEU would receive $88.50 from a market maker. The market maker could then proceed to sell the exchange share to a second individual or entity who was looking to buy. The market maker could sell the exchange share to this second individual or entity for $88.55. The "spread" would be $0.05 and could be kept by the market maker. When high volumes of exchange shares are traded, a market maker could accumulate a large amount of money in this way.

Another example of earning spread money will now be described. In certain embodiments of the invention an individual or entity wishing to buy or sell an exchange share will be able to specify the price that they wish to pay or receive per share. This would typically present itself as a individual or entity asking to buy or sell a certain number of exchange shares at a price somewhere between best bid and best offer. Under certain conditions, a market maker would be willing to accept the proposal. For example, Although accepting to sell exchange shares at less than best offer would result in the market maker receiving less spread money per share sold, if the quantity of exchange shares was high enough the market maker could still make a respectable—if not excellent—profit. It is specifically noted that embodiments which allow individuals and entities to specify the price they wish to pay or receive per exchange share offer great advantage to these individuals and entities because it effectively allows them to exercise control the rate at which currency exchange occurs.

In certain embodiments of the invention, there are further ways that an exchange share market maker can make profits. For example, a market maker may negotiate with a stock exchange empowered by the invention a per transaction fee relating to the exchange share or shares for which he has responsibility. Under such conditions, the market maker might receive a fee whenever the exchange share for which he had responsibility was bought or sold. Thus the market maker could earn a profit even if, for example, there was no profit in the spread or if a trade was performed between third parties without the direct intervention of the market maker. In some cases the per transaction fee might be in the form of a license fee for use of intellectual property related to performing currency exchange over existing stock exchanges.

Although in certain examples each exchange share market maker was responsible for only one exchange share, it is specifically noted than in some embodiments a single exchange share market maker may be responsible for more than one exchange share.

Operation

Figure 2:
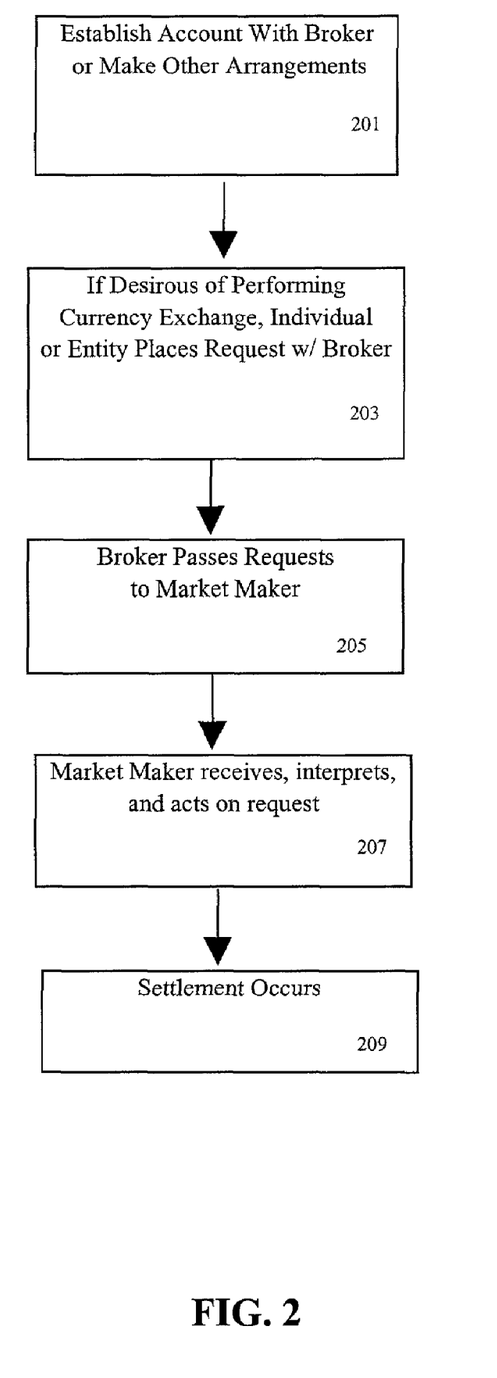
FIG. 2. is a flow chart showing steps involved in performing currency exchange according to an embodiment of the invention.

In certain embodiments, an individual or entity planning to perform foreign exchange on an existing stock exchange empowered by the present invention to offer this functionality would first establish with a broker an account denominated in the native currency of the stock exchange (step 201). Funds necessary to execute exchange share purchases, as well as funds received from exchange share sales, would preferably be taken from and placed into this account. In other embodiments, rather than establishing such an account, the individual or entity would make other arrangements with the broker (also step 201). For example, the individual or entity might agree provide for each purchase request cash, check, money order, or the like in an amount adequate to execute the purchase. Depending on the embodiment, this payment might be due before execution of a purchase or within a certain time period after execution. Similarly in cases where no such account is established, the individual or entity might receive capital resulting from exchange share sales in the form of cash, check, money order, or the like within a certain time period after the execution of the sale.

When desiring to execute a currency exchange, the individual or entity could place a request with the broker with whom a business relationship had been established (step 203). The broker would in turn pass the request to a exchange share market maker (step 205). In some embodiments the request may be passed to more than one market maker, with the market makers receiving the request deciding among themselves which will act upon the request.

As alluded to above, depending on the embodiment, a number of elements could be contained in such a request. A typical request includes at least an indication of whether the request is to sell or to buy, the number of shares which will be traded, and the name of the exchange share to be traded. For example, a request might state:

BUY 12 exchange shares of USJP where each exchange share of "USJP" indicates 100 Yen priced in U.S. Dollars, the later being the native currency of the exchange upon which the exchange share is posted.

The market maker forwarded this request would interpret and act upon it (step 207). Continuing with the example, the market maker would interpret it as a request to purchase 12 shares of USJP at the active offer price at the time the trade was actually executed. Depending on the embodiment, the active offer price might be, for example, the active offer price posted by the market maker receiving the request or the active best offer price among all of the market makers associated with that exchange share.

In step 209 settlement occurs. Assuming the individual or entity had a brokerage account denominated in terms of the currency used to perform the trade (in this case the native currency of the stock exchange), with execution of the trade the funds due in a purchase or received in a sale would be added to or extracted from the account. Continuing with the example, the number of U.S. Dollars necessary to cover the purchase would be extracted from the account. In cases where no such account had been established, the funds due in a purchase or received in a sale would be drawn from or added to an account owned by the brokerage house, with the individual or entity ultimately paying or receiving the funds as described above.

In certain cases, the individual or entity could also have an established account with his broker denominated in terms of the currency purchased or sold, in this example Japanese Yen. In this example, the Yen purchased would be placed in this account. In some embodiments if no such account had been established before a sale, such an account would be established with execution of the sale and the currency purchased placed therein. In still further embodiments, the currency purchased would be made physically available to the purchaser by pickup or delivery, or a check drawn on a bank that dealt in the currency issued could be cut. Although in certain aspects a request for purchase has been described here in order to teach by example, it will be obvious to those skilled in the art that sell requests could be made in a similar manner.

As noted above, in some embodiments an individual or entity requesting the purchase or sale of exchange shares may include stipulations in the request such as rate at which the exchange is to be performed, expressed in terms of a requested amount to pay or receive per share exchanged. Such a request submitted to the broker might take the form of:

SELL 12 exchange shares of USJP at $100.00 or more per share.

indicating that the buyer only wished for the trade to be executed if his price per share could be met. As explained above, the market maker receiving the request via the broker could decide to grant or deny it based on factors such as the number of shared offered and/or how the requested price differed from the active bid prices.

Although this example describes a request for a sale, it will be obvious to those skilled in the art that purchase requests including stipulations could be made in a similar manner. Furthermore additional stipulations will be obvious to those of skill in the art. For example, a request might include a stipulation on the number of shares to be bought or sold:

SELL at least 75 exchange shares of USJP.

or a stipulation concerning the time within which the trade it to be executed:

SELL 5 exchange shares of USJP in 15 minutes or less.

It is specifically noted that a single buy or sell request may include multiple stipulations of different types.

In embodiments of the present invention wherein a stock exchange only allows for the listing and trade of exchange shares in native currency, by at least the following procedure conversion may be performed between two currencies listed on the exchange wherein neither is the native currency of the exchange. This procedure will now be performed by way of example.

Suppose an exchange's native currency was the U.S. Dollar, and at least the following exchange pairs were listed on the exchange:

| USEU | USJP |
| --- | --- | wherein "USEU" indicated a predetermined number of Euros to be bought or sold for U.S. Dollars (the native currency), while "USJP" indicated a predetermined number of Yen to be bought or sold for U.S. Dollars.

Figure 3:
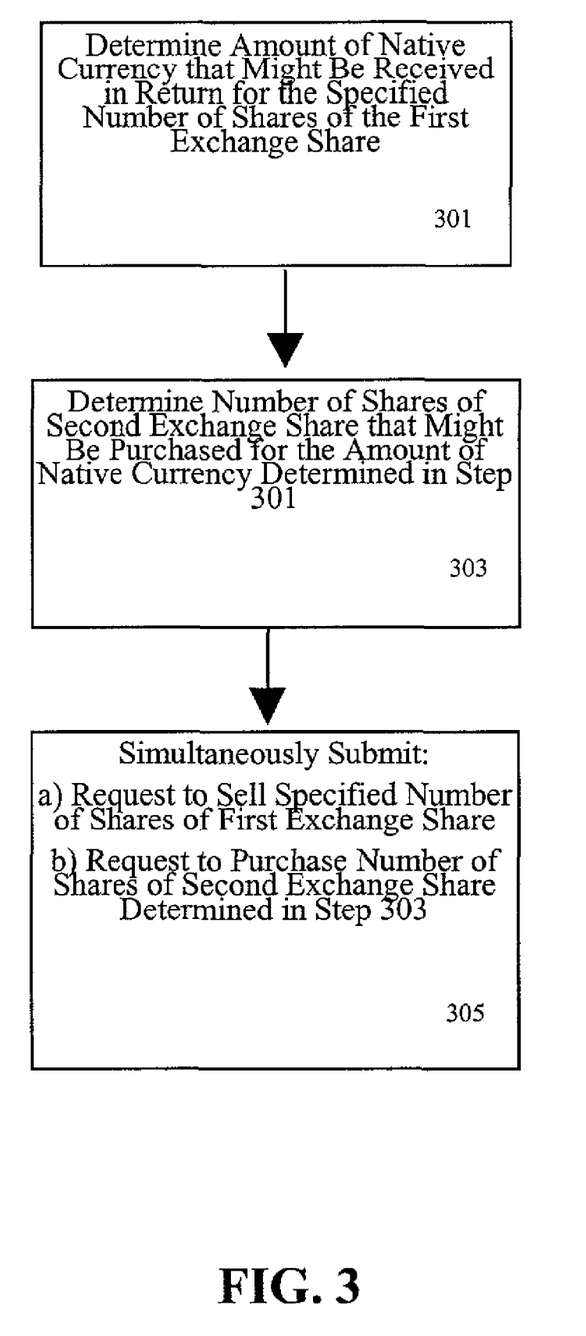
FIG. 3 is a flow chart showing for a stock exchange that only allows listing and trade of exchange shares in its native currency steps involved in performing conversion between two currencies listed on the exchange wherein neither is the native currency of the exchange.

Suppose that an individual or entity wished to exchange Euros for Yen. According to one embodiment of the invention, the individual or entity could submit to their broker a request such as:

CONVERT 12 exchange shares of USEU to USJP perhaps for convenience worded as:
CONVERT 12 exchange shares of EU to JP In response the broker, either manually or using a general purpose computer, could perform the following steps as shown in FIG. 3.

First, in step 301, the Level II data concerning USEU would be consulted to determine the number of U.S. Dollars that could be received in return for 12 exchange shares of USEU. Depending on the embodiment, this determination may be based on the best bid prices, the highest bid price, the lowest bid price, other bid prices, or a mathematical operation performed on all or some of these or similar values. Which of these to use might depend on the desires of the broker and/or individual or entity. For example, if the broker wanted to execute the exchange as quickly as possible, perhaps to prevent discrepancies of the sort explained below, the broker may make the determination based on the lowest bid; it is expected that such a request would be more quickly selected by a market maker because it would likely lead to higher spread profits.

Next, in step 303, the Level II data concerning USJP could be consulted to determine the number of exchange shares of USJP that could be purchased for the number of U.S. Dollars determined in step 301. In a manner analogous to that described in terms of step 301, this determination could be made based on the USJP best offer, highest offer, or the like. It is specifically noted that in certain embodiments of the invention Level I data might be used instead of Level II data in steps 301 and 303.

Then, in step 305, two requests would simultaneously be submitted to the market makers. The first, directed to a market maker for USEU, would be a request to sell 12 exchange shares of USEU. Depending on the embodiment, this request might stipulate that no less 12 exchange shares sold, a stipulated price to receive per share, and/or other requirements. The second, directed to a market maker for USJP, would be a request to purchase the number of exchange shares of USJP determined in step 303. This request, like the first, could in some embodiments include stipulations. For example, a broker interested in preventing discrepancies of the sort explained below may make the stipulate the price paid per share to be at least the lowest listed bid.

Because these requests are be issued in parallel, it is likely that the money received from the sale in the first request would not be received in time to satisfy the immediate execution of the second request. To solve this problem, the broker could stand ready pay from its own resources for all or some of the cost of executing the second request. The broker could then replenish its resources using the money received from the execution of the first request. Depending on the embodiment, different procedures could be followed to deal with any discrepancy between the money received by execution of the first request or paid in execution of the second request. For example, the individual or entity requesting the exchange might be forwarded any excess or billed for any deficit. In other embodiments, the broker may keep any excess while billing the individual or entity for any deficit. In still another example, the broker may keep any excess while taking financial responsibility for any deficit. Certain thresholds might be set whereby, for example, the broker would only bill or credit the individuals or entities for deficits or credits in excess of a certain number of units of native currency. It is noted that keeping such excess funds is a source of possible profit for brokers.

It should be clear that by simultaneously forwarding to market makers the requests of steps 105, one may use a stock exchange only allowing transactions in native currency to convert between two listed non-native currencies without the problems that would arise from waiting for the first step to execute before forwarding the second.

As will be obvious to those of skill in the art, such a procedure may be eliminated for markets which allow for listing and exchange in other that the native currency. Thus if an exchange's native currency was the U.S. Dollar but allowed for listing and exchange in other than its native currency, at least the following exchange pairs could be listed:

| USEU | USJP | JPEU |
|------|------|------| wherein "USEU" and "USJP" are as in the example above, and "JPEU" indicates a predetermined number of Euros to be bought or sold for Yen. Thus an individual or entity who, as above, wished to convert Euros to Yen could simply request to sell exchange shares of JPEU. If EUJP were instead listed, the individual or entity wishing to convert would instead request to buy exchange shares of EUJP.

Figure 4:
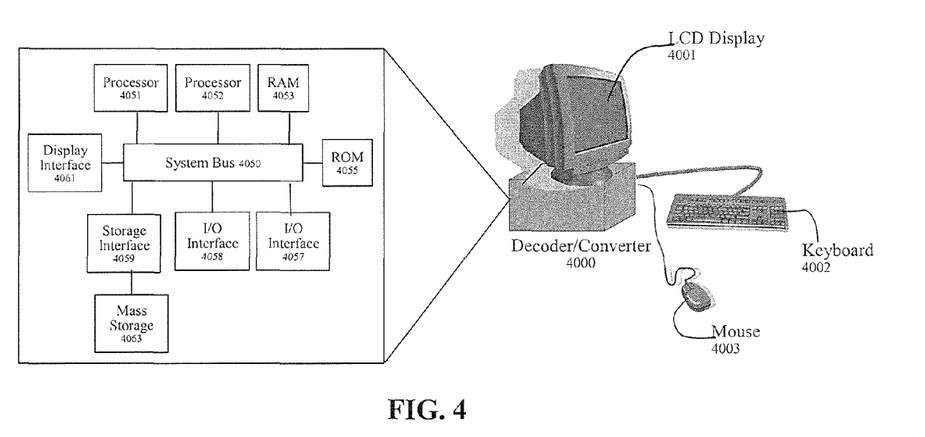
FIG. 4 shows an exemplary general purpose computer which may be used for performing certain aspects of the present invention.

As noted above, certain aspects of the present invention may be executed by or with the help of a general purpose computer. The phrases "general purpose computer," "computer," and the like, as used herein, refer but are not limited to an engineering workstation, PC, Macintosh, PDA, web-enabled cellular phone and the like running an operating system such as OS X, Linux, Windows CE, Windows XP, Sybian OS, or the like. The phrases "General purpose computer," "computer," and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 4000 as shown in FIG. 4 includes system bus 4050 which operatively connects two processors 4051 and 4052, random access memory (RAM) 4053, read-only memory (ROM) 4055, input output (I/O) interfaces 4057 and 4058, storage interface 4059, and display interface 4061. Storage interface 4059 in turn connects to mass storage 4063. Each of I/O interfaces 4057 and 4058 may be an Ethernet, IEEE 1394, IEEE 802.11, or other interface such as is known in the art. Mass storage 4063 may be a hard drive, optical disk, or the like. Processors 4057 and 4058 may each be a commonly known processor such as an IBM or Motorola PowerPC or an Intel Pentium.

Computer 4000 as shown in this example also includes an LCD display unit 4001, a keyboard 4002 and a mouse 4003. In alternate embodiments, keyboard 4002 and/or mouse 4003 might be replaced with a pen interface. Computer 4000 may additionally include or be attached to card readers, DVD drives, or floppy disk drives whereby media containing program code may be inserted for the purpose of loading the code onto the computer.

In accordance with the present invention, computer 4000 may be programmed using a language such as Java, Objective C, C, C#, or C++ according to methods known in the art to perform those operations described above.

RAMIFICATIONS AND SCOPE

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A system to handle exchange of a foreign currency, comprising:
a memory having program code stored therein; and
a processor operatively connected to said memory for carrying out instructions in accordance with said stored program code,
wherein said program code, when executed by said processor, causes said processor to perform:
establishing the foreign currency as one or more exchange shares of stock on a stock exchange, wherein each of the one or more exchange shares of the stock comprises one or more units of the foreign currency offered for trade in terms of a native currency of the stock exchange;
presenting the stock on the stock exchange, using quotation of the stock exchange; and
establishing a predetermined number of market makers having responsibility for the stock, wherein one or more requests to purchase or sell at least one of the one or more exchange shares of stock are passed to one or more of the market makers.

2. The system of claim 1, wherein said responsibility includes posting a bid and offer for one or more of the exchange shares of said stock.

3. The system of claim 1, wherein said responsibility includes offering to purchase or sell one or more exchange shares of said stock for posted amounts.

4. The system of claim 1, wherein the stock comprises a number of units of Japanese Yen offered for trade in terms of United States Dollar.

5. The system of claim 4, wherein the stock is given a name USJP.

6. The system of claim 1, wherein the stock comprises a number of units of Euro offered for trade in terms of United States Dollar.

7. The system of claim 6, wherein the stock is given a name USEU.

8. The system of claim 1, wherein the stock comprises a number of units of Canadian Dollar offered for trade in terms of United States Dollar.

9. The system of claim 8, wherein the stock is given a name USCA.

10. A system to handle exchange of a foreign currency, comprising:
a memory having program code stored therein; and
a processor operatively connected to said memory for carrying out instructions in accordance with said stored program code,
wherein said program code, when executed by said processor, causes said processor to perform:
establishing the foreign currency as one or more exchange shares of stock on a stock exchange, wherein each of the one or more exchange shares of the stock comprises one or more units of the foreign currency offered for trade in terms of a currency different than the foreign currency;
presenting the stock on the stock exchange, using quotation of the stock exchange; and
hosting a predetermined number of market makers having responsibility for the stock, wherein one or more requests to purchase or sell at least one of the one or more exchange shares of stock are passed to one or more of the market makers.

11. The system of claim 10, wherein said responsibility includes posting a bid and offer for one or more of the exchange shares of said stock.

12. The system of claim 10, wherein said responsibility includes offering to purchase or sell one or more exchange shares of said stock for posted amounts.

13. The system of claim 10, wherein the stock comprises a number of units of Japanese Yen offered for trade in terms of United States Dollar.

14. The system of claim 13, wherein the stock is given a name USJP.

15. The system of claim 10, wherein the stock comprises a number of units of Euro offered for trade in terms of United States Dollar.

16. The system of claim 15, wherein the stock is given a name USEU.

17. The system of claim 10, wherein the stock comprises a number of units of Canadian Dollar offered for trade in terms of United States Dollar.

18. The system of claim 17, wherein the stock is given a name USCA.

\* \* \* \* \*